July 16, 1929.  C. C. GROTNES  1,720,833
MACHINE FOR ROLLING RIMS AND OTHER ANNULAR OBJECTS
Filed March 28, 1925   7 Sheets-Sheet 2

Inventor:
Carl C. Grotnes,
Attys.

July 16, 1929. C. C. GROTNES 1,720,833
MACHINE FOR ROLLING RIMS AND OTHER ANNULAR OBJECTS
Filed March 28, 1925 7 Sheets-Sheet 3

Inventor:
Carl C. Grotnes,
By
Attys.

July 16, 1929.  C. C. GROTNES  1,720,833
MACHINE FOR ROLLING RIMS AND OTHER ANNULAR OBJECTS
Filed March 28, 1925  7 Sheets-Sheet 4
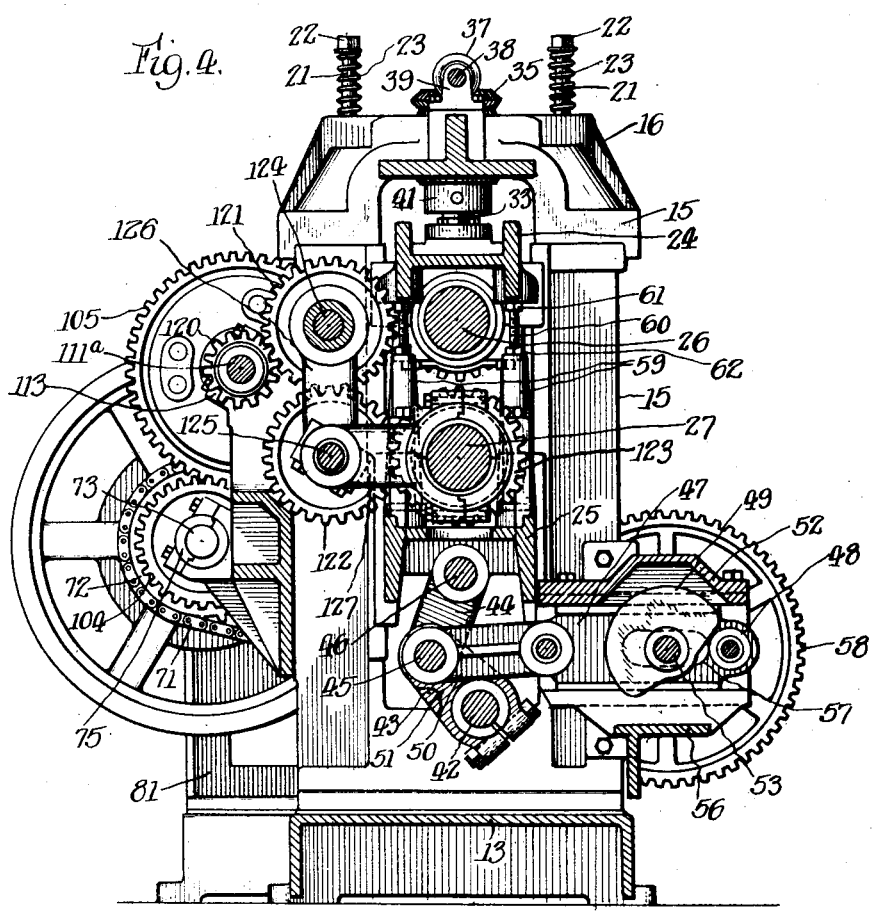
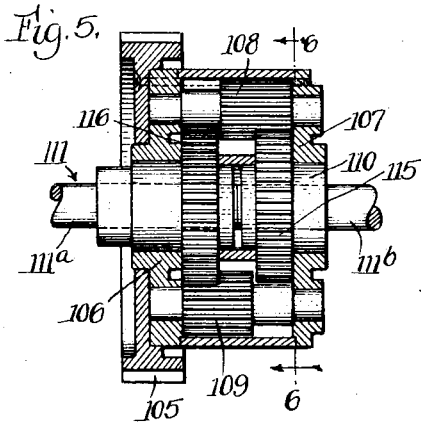
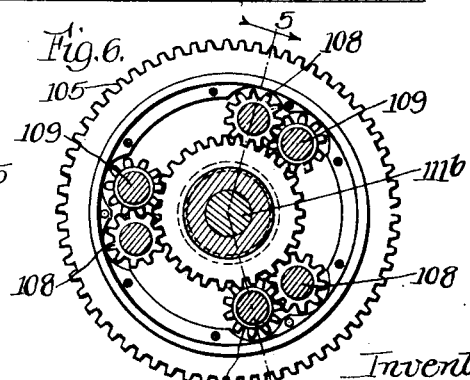

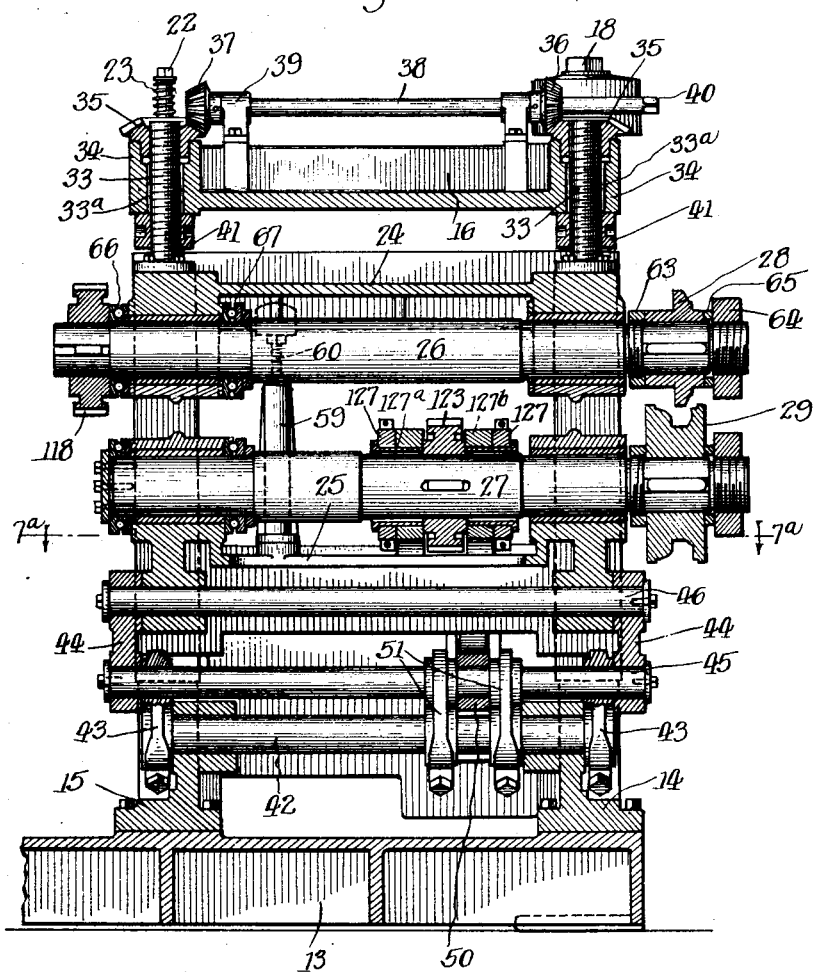

July 16, 1929.  C. C. GROTNES  1,720,833
MACHINE FOR ROLLING RIMS AND OTHER ANNULAR OBJECTS
Filed March 28, 1925  7 Sheets-Sheet 6
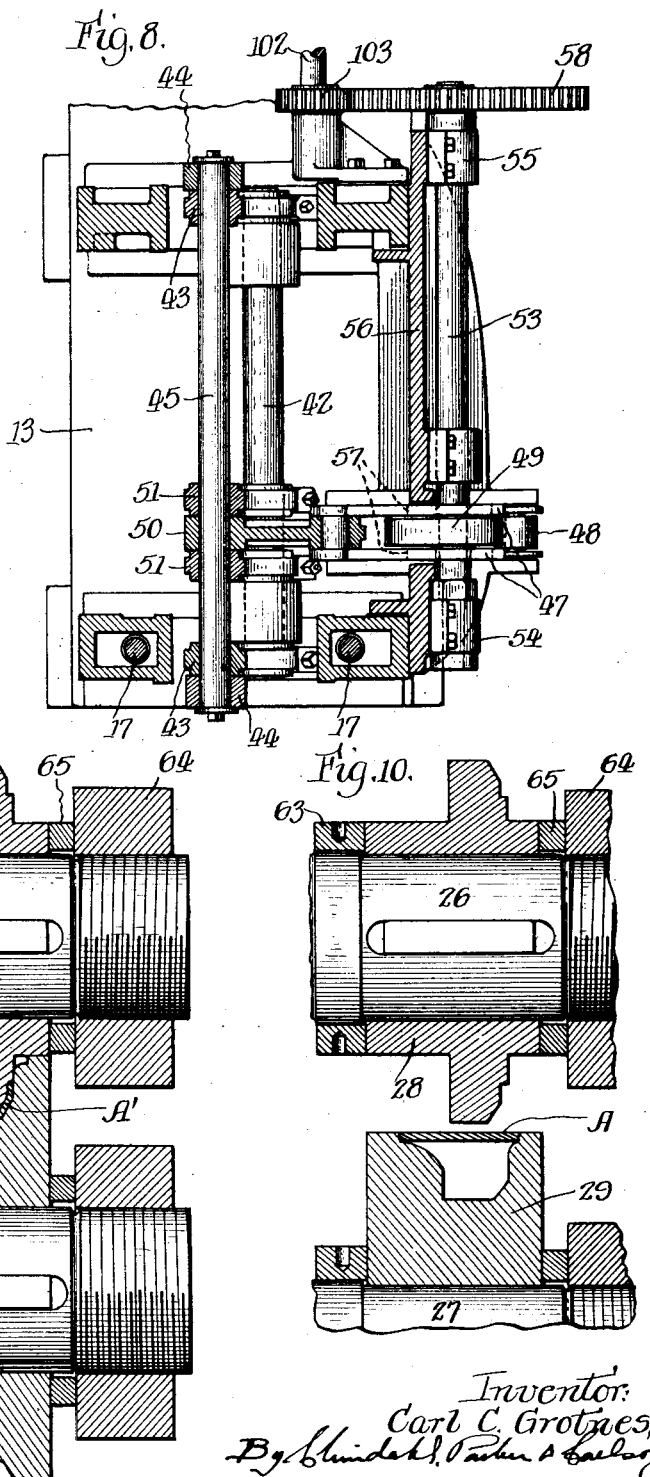
Inventor:
Carl C. Grotnes,
By Chindahl, Parker & Carlson
Attys.

Inventor:
Carl C. Grotnes,

Patented July 16, 1929.

1,720,833

UNITED STATES PATENT OFFICE.

CARL C. GROTNES, OF CHICAGO, ILLINOIS.

MACHINE FOR ROLLING RIMS AND OTHER ANNULAR OBJECTS.

Application filed March 28, 1925. Serial No. 18,949.

The invention relates to a machine for rolling annular metallic objects such as automobile wheel rims for the purpose of producing in such object a desired cross sectional form or shape.

The object of the invention generally stated is to provide in a machine of the character indicated an extremely rugged construction capable of withstanding heavy strains, while the parts are advantageously arranged to lend compactness to the machine structure, the forming means being located in a conveniently accessible position at one end of the machine so as to facilitate the insertion and removal of the work.

Another object is to provide a novel driving mechanism for two forming rolls, which is adapted to permit the rolls to operate at varying speeds. With this purpose in view, the machine is provided with a differential gear mechanism interposed between the two rolls on the one hand and the driving mechanism on the other so as to permit varying speeds between the two rolls as the diameters of the work being shaped varies in the forming operation.

A further object is to provide means for restraining effectually any tendency of the roll-carrying spindles to move out of parallel relation as the rolls are being forced into engagement with the work.

The objects of the invention thus set forth together with other and ancillary advantages are obtained by the construction and arrangement illustrated in the accompanying drawings forming part hereof. It is contemplated, however, that various changes in the construction and arrangement herein shown and described may be made by those skilled in the art without departing from the spirit and scope of the invention as expressed in the appended claims.

Figure 1 of the drawings is a side elevational view of a machine embodying my invention.

Fig. 2 is a forward end view with the forward ends of the roll-carrying spindles in section.

Fig. 2ª is a fragmentary detail view showing a piece of work being rolled.

Fig. 4 is a vertical sectional view taken approximately in the plane of line 4—4 of Fig. 1.

Figs. 5 and 6 are fragmentary sectional views through the differential gear mechanism, Fig. 5 being taken approximately in the plane of line 5—5 of Fig. 6, and Fig. 6 being taken approximately in the plane of line 6—6 of Fig. 5.

Figure 2:
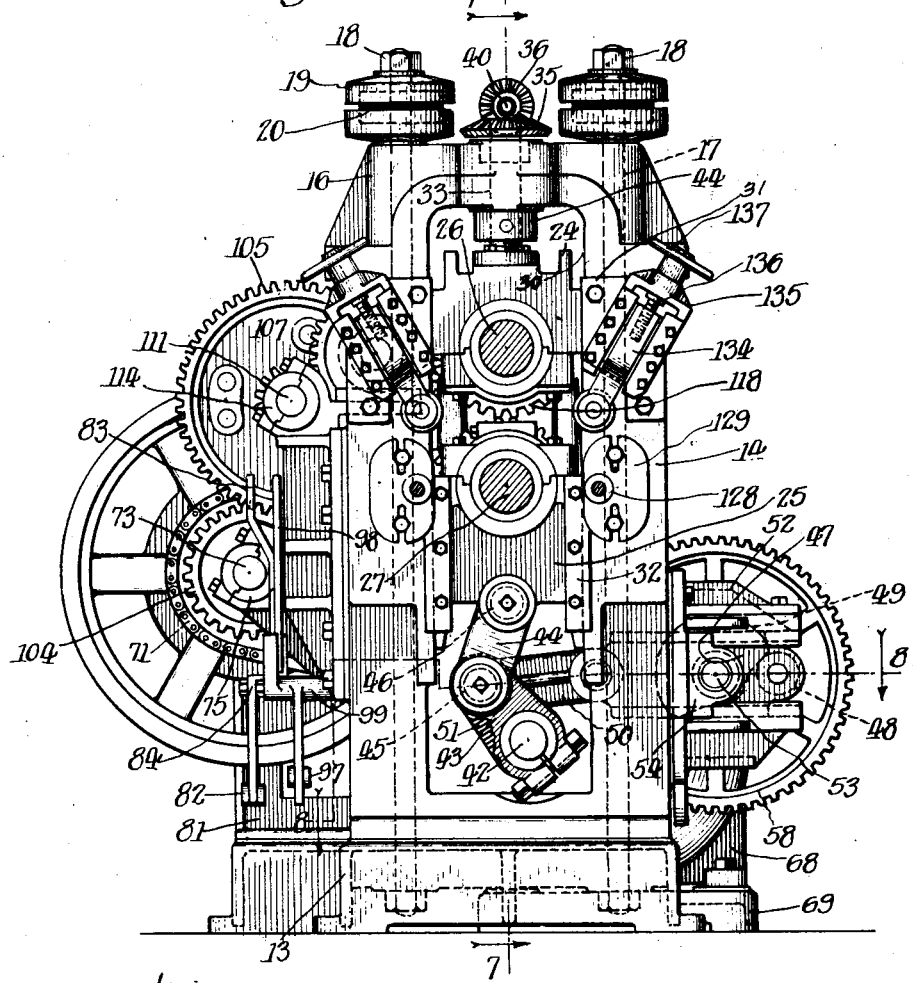
Figure 2A:
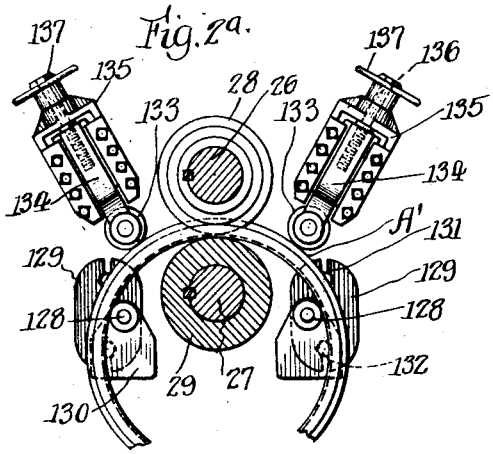

Fig. 7 is a vertical longitudinal sectional view through the forward portion of the machine, the same being taken approximately in the plane of line 7—7 of Fig. 2.

Fig. 7ª is a horizontal section approximately in the plane of line 7ª—7ª of Fig. 7.

Fig. 8 is a fragmentary transverse sectional view taken approximately in the plane of line 8—8 of Fig. 2.

Figs. 9 and 10 are fragmentary detail sectional views illustrating the manner of forming an automobile rim from a flat ring or band.

Figure 3:
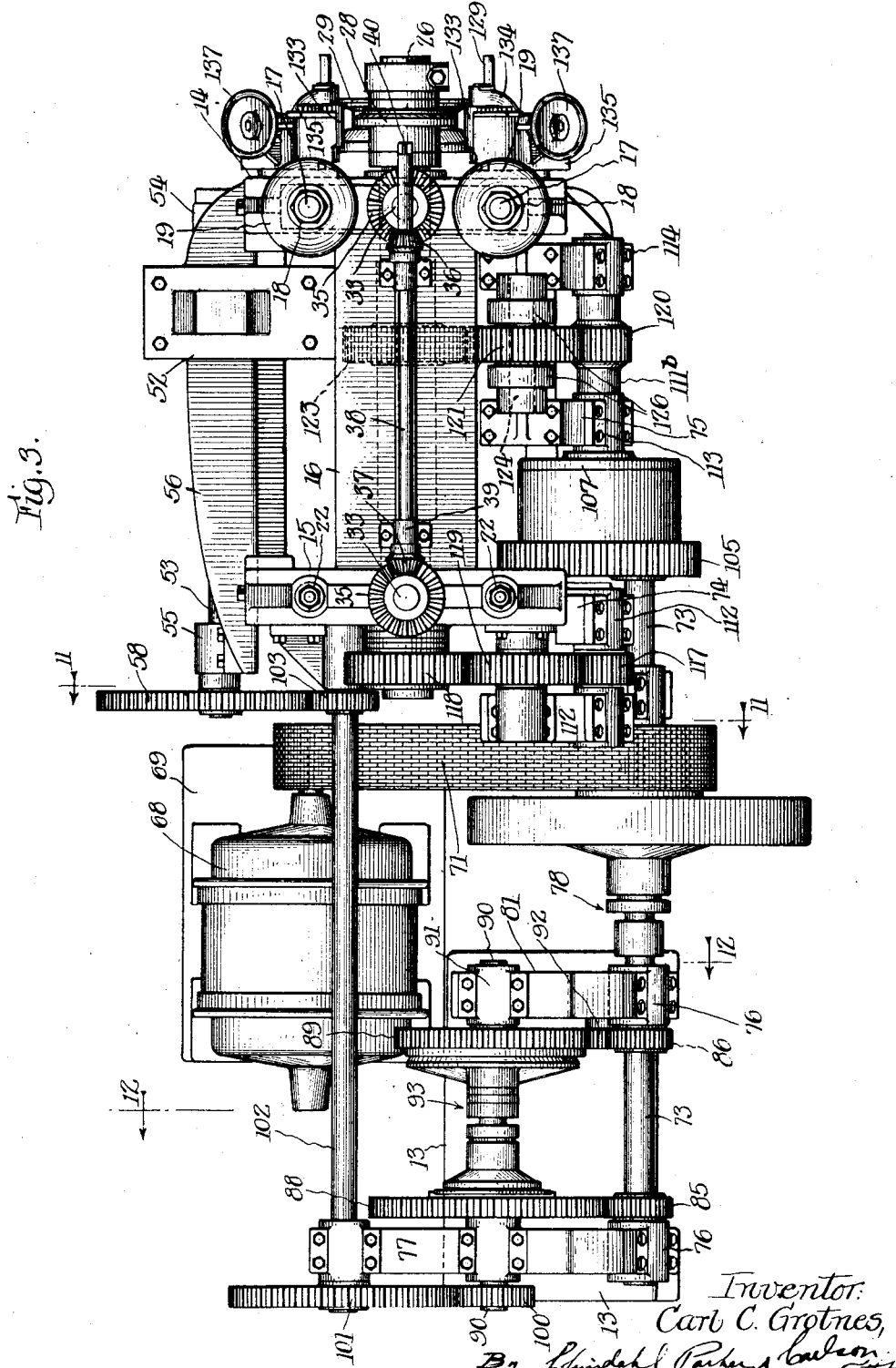
Fig. 3 is a plan view of the machine.
Figure 11:
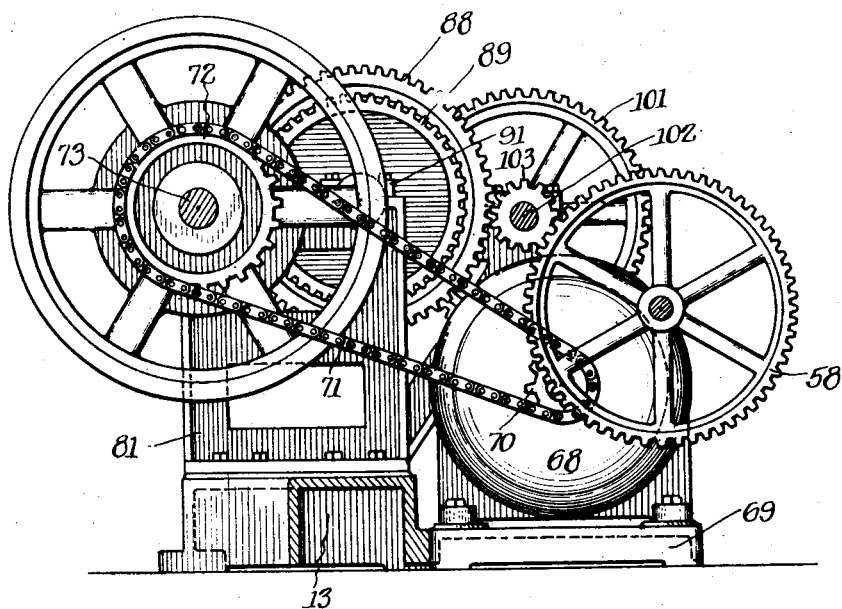
Figure 12:
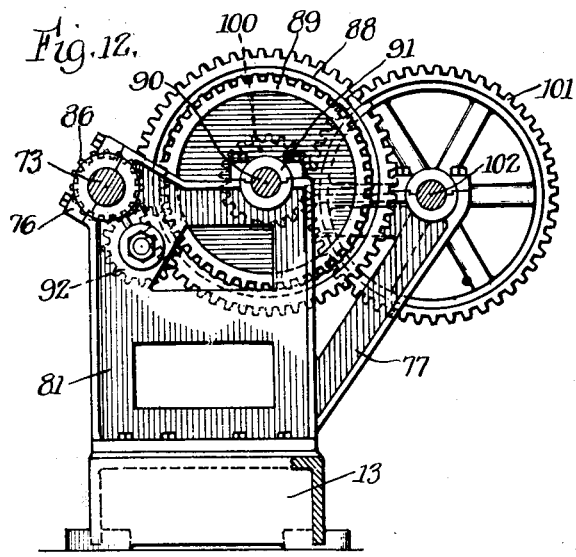

Figs. 11 and 12 are transverse sectional views taken approximately in the plane of line 11—11 and 12—12 of Fig. 3.

Figure 1:
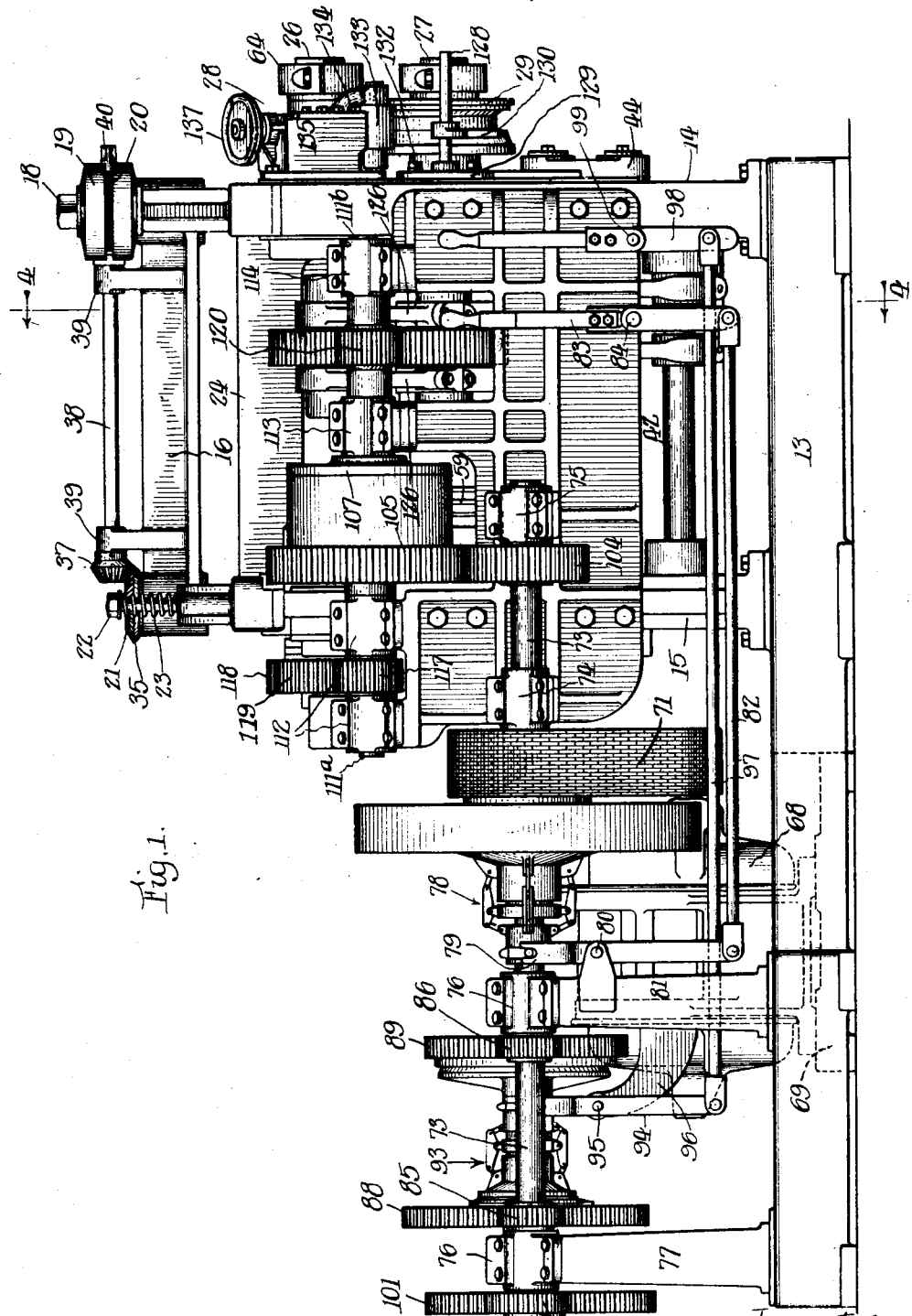

Referring now to Fig. 1, the machine comprises an elongated relatively narrow base 13 having an upright frame at its forward end composed of a pair of spaced upright standards 14 and 15. These standards are connected at their upper ends by means of a top frame 16. The forward end of the top frame (Fig. 2) is herein secured to the front standard 14 by means of a pair of vertical tie rods 17 extending through the standard 14 and anchored at their lower ends in the base 13. These rods pass through the frame 16 and their upper end portions project above the frame and are provided with nuts 18. Between the nuts 18 on said rods and the frame 16 are interposed pairs of cup-shaped members 19, and between said members in turn are interposed disks or blocks 20 of rubber. The rear end of the frame 16 is secured to the standard 15 through the medium of a pair of rods 21 slidable in vertical openings through the head and anchored at the upper end of the standard 15 near opposite sides thereof. The upper ends of the rods 21 are provided with nuts 22 spaced from the top of the frame and interposed between said nuts and the frame are coiled expansion springs 23.

Mounted for up and down movement in the standards 14 and 15 is a pair of elongated heads 24 and 25 in which are journaled upper and lower spindles 26 and 27 respectively having their forward ends projecting from the standard 14 and equipped with suitably shaped forming rolls 28 and 29. Each of said heads is substantially rectangular in form and the standards 14 and 15 are provided with central openings having at opposite sides guideways 30 with which opposite sides of the heads are adapted to engage, the outer faces of the standards being provided with suitable gib plates 31 and 32 to retain the heads in position.

The upper head 24 is normally held stationary but is adjustable vertically to accommodate rims or work of different thicknesses. The means which I, in the present instance, employ for thus adjustably securing the upper head 24 in position comprises (Fig. 7) a pair of screws 33 connected at their lower ends with opposite ends of the head 24 centrally thereof and passing through apertures 33$^a$ formed in enlargements 34 at opposite ends of the top frame 16. The upper ends of the screws project above the enlargements 34 of the frame and have threaded thereon bevel gears 35 meshing with bevel pinions 36 and 37 on a longitudinally extending shaft 38 which is journaled near its opposite ends in suitable brackets 39 carried by the top frame. The forward end of the shaft 38 extends beyond the gear 36 and is squared as at 40 whereby it may be turned to adjust opposite ends of the head simultaneously. Preferably, lock nuts 41 are provided on each of the screws below the enlargements 34 to lock the upper head in any desired position of adjustment.

The lower head 25 is arranged to be moved up and down in its guideways by a toggle mechanism (Figs. 2, 4 and 7). This mechanism comprises a longitudinal rock shaft 42 journaled at opposite ends in the lower ends of the standards 14 and 15 (Fig. 7) and having near opposite ends, between the standards, links 43 arranged to be secured in adjustable position upon the shaft. The links 43 form parts of two toggles of which links 44 are the other part. Said links 43 and 44 are pivotally mounted at their adjacent ends upon a rod 45, the two toggles being located near opposite ends of this rod. The connection between the toggles 43, 44 and the lower head 25 is accomplished by means of a rod 46 journaled at opposite ends in opposite ends of the head, as shown clearly in Fig. 7.

For operating the toggles 43, 44, I provide a transversely operating slide head 47 (Fig. 4) having a roller 48 at its outer end arranged to be engaged by a cam 49 and connected with the rod 45 by means of a link 50. The rod 45 in turn is connected by means of a pair of links 51 arranged on opposite sides of the link 50 and adjustably secured at their opposite or lower ends to the rock shaft 42. The head 47 is mounted to slide in a frame 52 mounted at one side of the standards 14 and 15, and the cam 49 is arranged to operate in this frame on a shaft 53 journaled in bearings 54 and 55 formed integral with the frame, the rear bearing 55 being formed on a rearward extension 56 of the frame 52.

The slide 47 has an elongated slot 57 to receive the shaft 53 and permit movement of the slide relative to the shaft. The rear end of the shaft has fast thereon a spur gear 58 which is connected with a source of power in a manner which will hereinafter appear, it being apparent that the arrangement is such that when the shaft 53 is rotated in a clockwise direction (Fig. 4) the cam 49 acting upon the roller 48 will move the slide outwardly, and this motion, transmitted by the links 50 and 51, to the rock shaft 42, causes the latter to straighten the links 43, 44 to raise the head 25 and hence the roll 29 on the spindle 27 toward the roll 28 on the spindle 26 of the upper head. It will be observed that the mechanism thus employed is capable of exerting great force to the lower head 25 and the roll 29 thereon, and because of the use of the toggle connections, the rate of movement of the head gradually decreases and the effective power thereon increases during the final or finishing position.

It is desirable that the rolls 28 and 29 be located in a conveniently accessible position so that the work may be readily inserted in place and removed from the machine. Therefore, I arrange the rolls forwardly of the front standard 14. Because of this arrangement the spindles tend to act as levers fulcrumed in their forward bearings especially during the final portion of the rolling operation when the maximum power is applied. Thus the forward ends of the spindle tend to separate and the rear ends of the spindles tend to move together. To relieve the spindle bearings of strain incidental to this tendency of the spindles to move out of parallel relation during the final portion of the rolling operation, and to insure that the rolls shall be maintained in parallel relation, I provide means which in the present instance is in the form of a pair of jacks 59 (Figs. 4 and 7) interposed between the heads 24 and 25 at the rear ends thereof and arranged upon opposite sides of the spindles 26 and 27. These jacks may be of any suitable construction comprising, for example, an upright casing in which is mounted a screw 60 having a nut 61 at its upper end and a lock nut 62 arranged to bear upon the upper end of the upright casing. The casings of the jack 59 are suitably secured on the lower head 25 at opposite sides of the spindles and the nuts 61 on the upper ends of both jacks are adapted to engage with the under side of the upper head 24. The arrangement is such that the nuts engage with the upper head as the lower roll 29 approaches the end of its upward movement, this being the point in the forming operation when the greatest pressure is exerted upon the work.

It will be remembered that the top frame 16 is mounted upon the standards 14 and 15 so as to be capable of yielding upwardly as permitted by the rubber blocks 20 and the coiled springs 23, the upper head being rigid with the top frame through the medium of the screws 33. The upward thrust of the lower roll 29 against the work is sustained by these yielding means and especially by the rubber blocks 20, the resiliency of the blocks being adjusted by means of the nuts 18 at the upper ends of the tie rods 17. This insures a smooth rolling operation and avoids injury to the machine.

Referring now to Figs. 7, 9 and 10, the forming rolls 28 and 29 are shaped to produce the desired cross sectional form in the rim or other piece of work. As shown herein, the rolls operate upon a band A (Fig. 10) to form it into a generally channel shape indicated at A' (Fig. 9). Obviously any desired form may be produced by varying the forming rolls, the latter being removably secured upon the spindles between nuts 63 and 64, and the rolls further being keyed upon the spindles. Herein spacing rings 65 are interposed between each of the rolls and their outer nuts 64.

Usually the forming rolls are of such a character that during the forming operation they tend to move axially, I therefore provide at the rear ends of the spindles suitable thrust bearings 66 and 67. These thrust bearings are, it will be noted from Fig. 7, located on opposite sides of the main spindle bearing formed in the heads 24 and 25.

The machine includes a single driving mechanism for actuating the cam 49 and toggle mechanism associated therewith, and for rotating the rolls 28 and 29. Referring first to Fig. 3, 68 designates an electric motor which is mounted on a platform 69 rigid with the main frame 13. The motor shaft has a sprocket pinion 70 which is connected by a chain 71 with a sprocket gear 72 loose on a drive shaft 73. Said shaft 73 is journaled in bearings 74 and 75 carried by the rear standard 15 and a pair of bearings 76 on the upper ends of standards or uprights 77 rising from the rear end of the frame. Connection between this shaft 73 and the sprocket gear 72 is accomplished by means of a friction clutch 78 of a suitable character arranged to be actuated by a lever 79 (Fig. 1) fulcrumed at 80 on the upper end of an upright 81 also carried by the rearward extension of the frame 13. A link 82 is connected to the lower end of the lever 79 and extends forwardly to near the front end of the machine for connection with a hand lever 83 pivoted to the frame at 84. By the operation of the hand lever 83 the operator may actuate the clutch 78 to control the operation of the shaft 73.

The rear end of the shaft 73 carries a pair of pinions 85 and 86 between the bearings 76, which are constantly connected to spur gears 88 and 89 on a countershaft 90 supported in bearings 91 parallel to the shaft 73. The gear 89 is connected with the pinion 86 through the medium of an idler 92 so that the gears 88 and 89 rotate in reverse directions. A double friction or reversing clutch 93 of any suitable character is provided to connect the gears 88 or 89 to the shaft 90 to rotate the latter in one direction or the other. This clutch 93 is arranged to be actuated into driving engagement with either of the gears 88 and 89 through the medium of a lever 94 (Fig. 1) fulcrumed at 95 on a bracket 96 on the upright 81. A link 97 connects the lower end of this lever with a hand lever 98 at the forward end of the machine fulcrumed at 99.

The clutch shaft 90 has a pinion 100 fast thereon at its rear end, meshing with a gear 101 on a shaft 102 journaled at one end in the upright 77 and at its other end in the rear standard 15. The forward end of the shaft 102 has a pinion 103 thereon meshing with the spur gear 58 on the cam shaft 53. By this train of driving connections the shaft 53, it will be observed, may be rotated in one direction or the other from the drive shaft 73 under the control of the clutches 78 and 93.

The forward end of the shaft 73 has fast thereon a spur pinion 104 meshing with a spur gear 105 (Figs. 1, 5 and 6). Said gear 105 forms part of a differential gear mechanism which I employ to drive the forming rolls 28 and 29. It is rigid with a ring 106 between which and a similar ring 107 are mounted three sets of driving pinions 108 and 109. The latter are provided with suitable journals at opposite ends bearing in the rings 106 and 107 and the rings in turn are mounted to rotate on enlarged portions 110 formed on the adjacent ends of the two sections 111$^a$ and 111$^b$ of a sectional shaft 111, the latter being suitably mounted in journal bearings 112, 113 and 114 carried by the machine frame. The pinion 108 of each set meshes with a gear 115 fast on the forward section 111$^b$ of the sectional shaft and the pinion 109 of each set meshes with a gear 116 on the rear section 111$^a$ of said shaft.

Referring now to Figs. 1, 3 and 4, the rear section 111$^b$ of the sectional shaft has a spur pinion 117 thereon connected with a spur gear 118 through an idler 119. The gear 118 is fast upon the rear end of the upper spindle 26.

The forward section 115$^b$ of the sectional shaft 111 has a spur pinion 120 thereon operating through a pair of idlers 121 and 122 to drive a spur gear 123 on the lower spindle 27. The idler 121 as shown in Fig. 4 is mounted on a shaft 124 suitably mounted in the frame, but the idler 122 is mounted on a shaft 125 supported by a pair of links 126 suspended from the shaft 124. Another pair of links 127 connect the shaft 125 to the spindle 27. This construction permits of a continuous driving connection between the shaft section 111ᵇ and the spindle 27 while the latter moves up and down into or out of engagement with the work.

I have found that when the machine is operated at high speed (a rate of production amounting to about eight rims per minute being customary) considerable heat is developed which is transmitted from the forming rolls to the frame of the machine. Such generation of heat in the lower spindle 27 has a tendency to expand it circumferentially, and to avoid a gripping action between the spindle and the bushings 127ᵃ on which are mounted the links 127, I provide a construction whereby these bushings are supported coaxially of the spindle 27 but spaced therefrom. Thus it will be observed I mount the bushings 127ᵃ in upstanding portions or lugs 127ᵇ on the head 25 with the bushings disposed coaxially of the spindle 27. The links 127 are mounted on these bushings while the latter are made of an internal diameter such as to provide the desired clearance between them and the spindle, thus avoiding binding action between the links and the spindle.

The heat developed in the operation of the machine also especially has a tendency to expand the heads 24 and 25 in which the roller spindles are journalled. Because the lower head 25 must move up and down in the operation of the machine a construction must be provided such as to permit such expansion without producing a binding of the head between the front and rear standards 14 and 15. To this end I mount the lower head in the standards so that one end is movable transversely therethrough while the other end is adapted to hold the head in position in the frame. Thus, referring to Fig. 7ᵃ the head 25 is provided near its forward end with side flanges 25ᵃ engaging with the rear face of the standard 14 and coacting with the gib plates 32 to hold the head in proper relation to the standard while permitting of its up and down movement therein. The rear end of the head on the other hand, while mounted to slide vertically in the ways provided in the rear standard 15, is free to move transversely of the standard in the expansion of the head.

The differential gear mechanism, it will be understood, operates in the usual and well known way, one section of the shaft 111 being free to turn faster or slower than the other shaft with a compensating increase or decrease in the speed of such other shaft.

The purpose of this construction and arrangement will be apparent from Figs. 9 and 10. Thus at the beginning of the forming operation the external diameter of the work A is substantially greater than at the end of the operation. Consequently the speed of rotation of the upper forming roll 28 relative to the lower forming roll is greater at the beginning of the operation, due to the greater circumference of the work, and gradually decreases as the effective circumference of the work is reduced. By the use of the differential mechanism, therefore, the two forming rolls are permitted to conform to each other in speed, thus avoiding any unnecessary frictional engagement between the rolls and the work such as would occur if the two rolls were driven at all times at the same speed. Accordingly a saving in power is effected and excessive wear on the forming rolls or dies eliminated.

In the operation of the machine, the operator places a band A or other piece of work over a pair of pins 128 which are supported by brackets 129 secured to the forward face of the front standard 14. The rear edge of the work bears against a pair of guide plates 130 adjustably mounted on the pins 128 carried by the brackets 129. The brackets 129 are adjustable vertically by the provision of slots 131 in opposite ends thereof through which securing screws 132 are entered.

The attendant now operates the clutch lever 83 to connect the drive shaft 73 to the source of power, and thereupon the lever 98 to actuate the reversing clutch 93 connecting the driven gear 88 with the shaft 90 so as to rotate the pinion 120 and the cam shaft 53 in a clockwise direction (Fig. 2). The toggle mechanism 43, 44 is thus actuated to raise the lower head 25, moving the lower forming roll 29 upwardly toward the upper forming roll 28. The work also moves in this operation into engagement with guide rollers 133 of a suitable character herein adjustably supported on the forward face of the upper head 24 through the medium of blocks 134 slidable in brackets 135 by the operation of screws 136 equipped with hand wheels 137.

The rolls are rotated in opposite directions continuously during the forming operation through their connections with the drive shaft 73 provided by the differential gear mechanism and the gear trains 117, 119, 118 on the one hand and 120, 121, 122 and 123 on the other hand. Initially the rolls rotate at substantially the same speed but as the forming operation progresses the speeds of the rolls vary with the reduction in diameter of the work.

As the two rolls approach the relation shown in Fig. 9, the nuts 61 on the upper ends of the jack screws 60 engage with the upper head 24 thus effectively controlling a tendency of the rear end of the upper spindle 26 to be depressed as a result of the upward force exerted against the roll 28 during the bending of a rim. Contact between screws 60 and head 24 occurs as the links 43, 44 of the toggle mechanism approach a relatively straightened relation, when the power applied is at the maximum. The upper head 24 being carried by the top frame 16, the latter, in this portion of the operation, yields slightly as permitted by the rubber blocks 20 and the coiled springs 23. By this arrangement the parallelism of the rolls as the rolling operation is completed is insured, and yet sufficient flexibility is provided to effect a smooth forming operation without danger of injury to the machine.

I claim as my invention:

1. A machine for rolling rims and the like having a base, a pair of standards mounted on the base at one end thereof in longitudinally spaced relation, a top frame connecting the upper ends of the standards, a pair of roll-carrying spindles, a pair of elongated heads in which the respective spindles are journaled, said heads being arranged one above the other, means carried by said top frame for adjustably supporting the upper one of said heads in said standards, means carried by the standards for moving the lower one of said heads toward and from the upper head, and means for rotating said rolls.

2. A machine of the character described comprising an upright frame, a horizontal top frame mounted upon said upright frame so as to be capable of a slight upward yielding movement, a pair of roll-carrying spindles, a pair of heads mounted in said upright frame for up and down movements therein, means for securing the upper head to said top frame, and means for raising and lowering the lower head.

3. A machine of the character described comprising an upright frame, a pair of heads mounted in said frame one above the other, roll-carrying spindles mounted in the respective heads, means for moving one of said heads toward the other, and means for supporting the other head adapted to permit a slight yielding movement thereof under pressure.

4. A machine of the character described having a pair of heads mounted for relative movement toward and from each other, roll-carrying spindles journaled in said heads, means including toggle links for moving one of said heads toward the other, and means for supporting the other head adapted to permit of a slight yielding movement thereof away from the movable head.

5. A machine of the character described having a pair of heads, roll-carrying spindles mounted in the respective heads, a pair of spaced upright standards in which said heads are mounted for up and down movements, a top frame carried by said standards so as to be capable of a slight upward yielding movement relative thereto, means for securing the upper head to said top frame, and means for raising and lowering the lower head.

6. A machine of the character described having a pair of upright standards mounted in spaced relation, a pair of elongated heads mounted at their opposite ends in said standards, a pair of roll-carrying spindles journaled in said heads and having portions projecting outwardly from one of said standards adapted to receive the forming rolls, means for stationarily supporting one of said heads in said standards but adapted to permit of a slight yielding movement thereof under pressure, means for moving the other head toward the stationary head, and means operating to prevent movement of the heads toward each other at the ends thereof opposite the rolls as the latter approach each other.

7. A rolling machine of the character described having a pair of elongated heads mounted for relative movement toward and from each other, spindles mounted in said heads and having portions projecting from one end thereof adapted to receive forming rolls, means for effecting relative movement between said heads, and means interposed between the heads near the ends thereof opposite the forming rolls adapted to restrain them from moving toward each other during the final portion of the relative approaching movement between the forming rolls.

8. A rolling machine of the character described having a pair of elongated heads mounted for relative movement toward and from each other, spindles mounted in said heads and having portions projecting from one end thereof adapted to receive forming rolls, means for effecting relative movement between said heads, and means interposed between the heads near the ends thereof opposite the forming rolls adapted to restrain them from moving toward each other during the final portion of the relative approaching movement between the forming roll, one of said heads having means normally holding it stationary but capable of permitting a slight yielding movement as said restraining means comes into operation.

9. A machine of the character described having an upright frame having a pair of spaced standards, a pair of elongated heads having their opposite ends mounted in said standards for relative movement therein, roll-carrying spindles journaled in said heads, means at the upper end of said frame for supporting one of said heads in a normally stationary position, and power driven means at the lower end of said frame operable to move the lower head toward and from the upper head including a toggle mechanism interposed between said frame and the lower head.

10. A machine of the character described having an upright frame, a pair of heads mounted in said frame for relative movement therein, roll-carrying spindles jouralled in said heads, means at the upper end of said frame for supporting one of said heads in a normally stationary position, means at the lower end of said frame operable to move the lower head toward and from the upper head including a toggle mechanism interposed between said frame and the lower head, and cam means at one side of the frame for actuating said toggle mechanism.

11. A machine of the character described having, in combination, an upright frame, a pair of roll-carrying spindles, a pair of heads in which said spindles are journaled mounted in said frame, means for supporting one of said heads in a normally stationary position in the frame but adapted to yield slightly under pressure, and means for moving the other head toward and from the stationary head adapted to exert a gradually increasing force upon the movable head toward the end of its approaching movement with respect to the stationary head, the arrangement being such that said stationary head is adapted to yield during the maximum application of pressure to the movable head.

12. A machine of the character described having, in combination, an upright frame, a pair of roll-carrying spindles, a pair of heads in which said spindles are journaled mounted in said frame, means for supporting one of said heads in a normally stationary position in the frame but adapted to yield slightly under pressure, means for moving the other head toward and from the stationary head adapted to exert a gradually increasing force upon the movable head toward the end of its approaching movement with respect to the stationary head, the arrangement being such that said stationary head is adapted to yield during the maximum application of pressure to the movable head, and means acting as the normally stationary head yields under pressure to maintain the spindles in parallel relation.

13. A machine of the character described having a pair of heads mounted for relative movement toward and from each other, roll-carrying spindles mounted in said heads, and means for moving one head toward the other including a toggle mechanism, means for actuating the toggle mechanism including a slide operatively connected with the toggle mechanism, a cam operatively associated with said slide, and means for rotating said cam.

14. A machine of the class described comprising an upright frame, a pair of heads mounted for relative up and down movements in said frame, roll-carrying spindles journaled in said heads, toggle mechanism interposed between one of said heads and the frame, a slide mounted for lateral movement at one side of the frame and operatively connected to the toggle mechanism, a roller on said slide, a cam adapted to engage with said roller, and means for rotating said cam.

15. A machine of the character described comprising a pair of elongated heads mounted at their opposite ends for relative movement toward and from each other, roll-carrying spindles journaled in said heads, and means for moving one of said heads toward the other including a toggle mechanism interposed between the heads at each end thereof, a rock shaft mounted in the frame, toggle links connecting said shaft with the movable head, and means for rocking said shaft.

16. A machine of the character described comprising a pair of heads mounted for relative movement toward and from each other, roll-carrying spindles journaled in said heads, and means for moving one of said heads toward the other including a toggle mechanism comprising a rock shaft mounted in the frame, toggle links connecting said shaft with the movable head, and means for rocking said shaft comprising a lever fast thereon and cam mechanism for actuating said lever.

17. A machine of the character described having a pair of upright standards, a pair of elongated heads having their opposite ends mounted in said standards, one of said heads being movable in the standards toward and from the other head, roll-carrying spindles journaled in said heads, a rock shaft mounted in the frame adjacent one of said heads, toggles connecting said rock shaft and said head at opposite ends of the latter, and means for rocking said shaft including a lever secured thereto and means for swinging said lever.

18. A machine of the class described comprising a pair of roll-carrying spindles mounted for relative movement toward and from each other, means for effecting relative movement between the spindles including a toggle mechanism and a cam for actuating the same, and a single drive mechanism arranged to rotate said spindles and said cam.

19. A machine of the character described comprising, in combination, a pair of spindles mounted for movement toward and from each other, means for effecting relative movement between the spindles, a drive shaft, means connecting said drive shaft with said spindle-moving means including a reversing clutch, and means actuated from said drive shaft for rotating said spindles irrespective of their relative positions.

20. A machine of the character described comprising in combination a pair of spindles mounted for relative movement toward and from each other and having rolls adapted to operate upon an annular piece of work interposed therebetween, and means for rotating said spindles during such relative movement including a drive shaft, a sectional shaft the respective sections of which are operatively associated with the respective spindles, and a differential gear mechanism connecting said sections and arranged to be driven from the drive shaft, said gear mechanism being operable to permit variations in the relative speeds of the spindles to compensate for variations in the diameter of the work as it is rolled.

21. A machine of the class described having in combination a pair of spindles having rolls adapted to operate upon an annular piece of work interposed therebetween, a drive shaft, a pair of driven elements respectively connected with the two spindles, and a differential gear mechanism operatively connected with the drive shaft and adapted to drive said elements, said gear mechanism being operable to permit variations in the relative speeds of the spindles to compensate for variations in the diameter of the work as it is rolled.

22. A machine for rolling rims or the like having a relatively narrow elongated base, an upright frame at one end of the base, a pair of heads mounted in said frame one above the other and having roll-carrying spindles journaled therein with portions projecting forwardly from said frame and adapted to receive forming rolls, an electric motor mounted on the rear end of the base at one side thereof, a drive shaft mounted above the base at the other side thereof and operatively connected with the motor, means for effecting relative movement between the spindle-carrying heads including a shaft, means including a reversing clutch connecting the last mentioned shaft to the drive shaft, and means operatively connected with the drive shaft for rotating said spindles.

23. A machine for rolling rims or the like comprising an elongated base, an upright frame at one end of the base, a pair of roll-carrying spindles mounted for relative movement toward and from each other in said frame, an electric motor mounted on the rear end of said base at one side thereof, a longitudinal drive shaft also mounted on the base at the side opposite said motor, clutch controlled means operatively connecting said motor with said drive shaft, means for effecting such relative movement between the spindles including a cam shaft mounted at one side of the frame and operatively connected with the drive shaft, and means for rotating the spindles including a driven shaft mounted on the frame opposite the cam shaft and having a gearing connection with the drive shaft.

24. A machine for rolling rims or the like comprising an elongated base, an upright frame at one end of the base, a pair of roll-carrying spindles mounted for relative movement toward and from each other in said frame, an electric motor mounted on the rear end of said base at one side thereof, a longitudinal drive shaft also mounted on the base at the side opposite said motor, clutch controlled means operatively connecting said motor with said drive shaft, means for effecting such relative movement between the spindles including a shaft mounted at one side of the frame and operatively connected with the drive shaft, and means for rotating the spindles including a driven shaft having a gearing connection with the drive shaft, the connection between the cam shaft and the drive shaft including a reversing clutch.

25. A rim rolling machine comprising, in combination a pair of frame members mounted in spaced parallel relation, a pair of roll-carrying spindles mounted for relative movement toward and from each other, a head slidably mounted in said frame members for carrying one of said spindles, and means coacting with said head and one of said frame members to hold the head against longitudinal movement, the other end of the head being free to move transversely of its frame member.

26. A rim rolling machine comprising, in combination, a frame, a pair of roll-carrying spindles mounted for relative movement toward and from each other in said frame, means for rotating one of said spindles while permitting its movement toward and from the other spindle including a driving gear element mounted to turn on a fixed axis, a driven gear element mounted upon said movable spindle, an idler gear, links operating to hold said idler gear in operative relation to said gear elements, and means for supporting one of said links in coaxial relation with said movable spindle but with a free annular space between it and the spindle to permit expansion of the spindle when heated.

27. A rim rolling machine comprising, in combination, a frame, a pair of roll-carrying spindles mounted for relative movement toward and from each other in said frame, means for rotating one of said spindles while permitting its movement toward and from the other spindle including a driving gear element mounted to turn on a fixed axis, a driven gear element mounted upon said movable spindle, an idler gear, and links operating to hold said idler gear in operative relation to said gear elements, the means for supporting the movable spindle comprising a head having a bushing supported by said head in coaxial relation to the spindle, said bushing being of a diameter somewhat greater than the spindle, and one of said links being mounted on said bushing.

28. A machine of the class described comprising, in combination, a main frame having a spindle journaled therein and having one end projecting from the frame and adapted to carry a forming roll, a second spindle, a movable frame unit in which said second spindle is journaled adapted to carry a coacting forming roll, said frame unit being elongated in form and providing bearings for said second spindle, means in the main frame for guiding said frame unit for movement to carry its spindle toward and from the first mentioned spindle, a toggle linkage acting between the main frame and each end of said movable frame unit, and power drive means for actuating the linkages to effect the movement of said frame unit.

29. A machine of the class described comprising, in combination, a main frame having a spindle journaled therein and having one end projecting from the frame and adapted to carry a forming roll, a second spindle, a movable frame unit in which said second spindle is journaled adapted to carry a coacting forming roll, said frame unit being elongated in form and providing bearings for said second spindle, means in the main frame for guiding said frame unit for movement to carry its spindle toward and from the first mentioned spindle, and power actuated means acting between the main frame and each end of the movable frame unit to effect the movement of the latter.

In testimony whereof, I have hereunto affixed my signature.

CARL C. GROTNES.